United States Patent [19]
Morrison

[11] Patent Number: 4,711,125
[45] Date of Patent: Dec. 8, 1987

[54] INERTIAL MEASUREMENT UNIT

[76] Inventor: Melvin M. Morrison, 6530 Independence Ave. #207, Canoga Park, Calif. 91303

[21] Appl. No.: 795,456

[22] Filed: Nov. 6, 1985

[51] Int. Cl.⁴ .............................................. G01C 21/12
[52] U.S. Cl. .................................... 73/178 R; 73/510; 73/517 A; 73/517 B
[58] Field of Search ................. 73/517 B, 517 A, 510, 73/178 R, 178 T, 178 H, 431

[56] References Cited

U.S. PATENT DOCUMENTS

| | | | |
|---|---|---|---|
| 3,112,962 | 12/1963 | Lautzenhiser | 308/10 |
| 3,184,271 | 5/1965 | Gilinson, Jr. | 308/10 |
| 3,628,383 | 12/1971 | Tikanen et al. | 73/516 |
| 3,636,774 | 1/1972 | Allison | 73/517 |
| 3,709,042 | 1/1973 | Lee et al. | 73/516 R |
| 3,823,990 | 7/1974 | Gilinson, Jr. | 308/10 |
| 3,954,024 | 5/1976 | Staats | 308/10 |
| 4,088,027 | 5/1978 | Hernandez et al. | 73/517 B |
| 4,316,394 | 2/1982 | Dohogne | 308/10 |
| 4,372,162 | 2/1983 | Shutt | 73/514 |
| 4,372,520 | 2/1983 | Shutt | 73/517 B |
| 4,397,185 | 8/1983 | Craig et al. | 73/517 B |
| 4,398,417 | 8/1983 | Shutt | 73/514 |
| 4,398,418 | 8/1983 | Shutt et al. | 73/517 B |
| 4,414,848 | 11/1983 | Shutt | 73/510 |
| 4,583,404 | 4/1986 | Bernard et al. | 73/517 B |

FOREIGN PATENT DOCUMENTS 1134655  11/1968  United Kingdom .............. 73/517 B

OTHER PUBLICATIONS

*Inertial Navigation*, by W. E. Shephard et al.
*Inertial Guidance*, by G. R. Pitman, 1962.
*Measurement Systems*, by E. O. Doebelin, revised ed. 1975.

*Primary Examiner*—Donald O. Woodiel
*Attorney, Agent, or Firm*—William J. Benman, Jr.

[57] ABSTRACT

An inertial measurement unit which provides three axis acceleration and angular turning rate detection with a cubical magnetically suspended sensor mass disposed within a cubical outer assembly. The sensor mass is free to move mechanically independent from the outer assembly. The sensor mass has a plurality of sensing and suspension elements of particular orientation on a selected plane for each axis of detection which face a corresponding set of sensing and suspension elements respectively on interior surfaces of said outer assembly. The sensing elements are advantageously cross-coupled to minimize cross-axis sensitivity. The invention utilizes several servo-control loops of conventional design to process outputs from the pickoffs and maintain the sensor mass in proper orientation.

19 Claims, 10 Drawing Figures

FIGURE 1
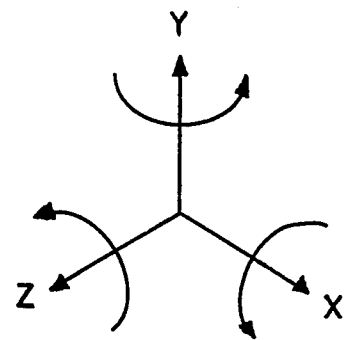
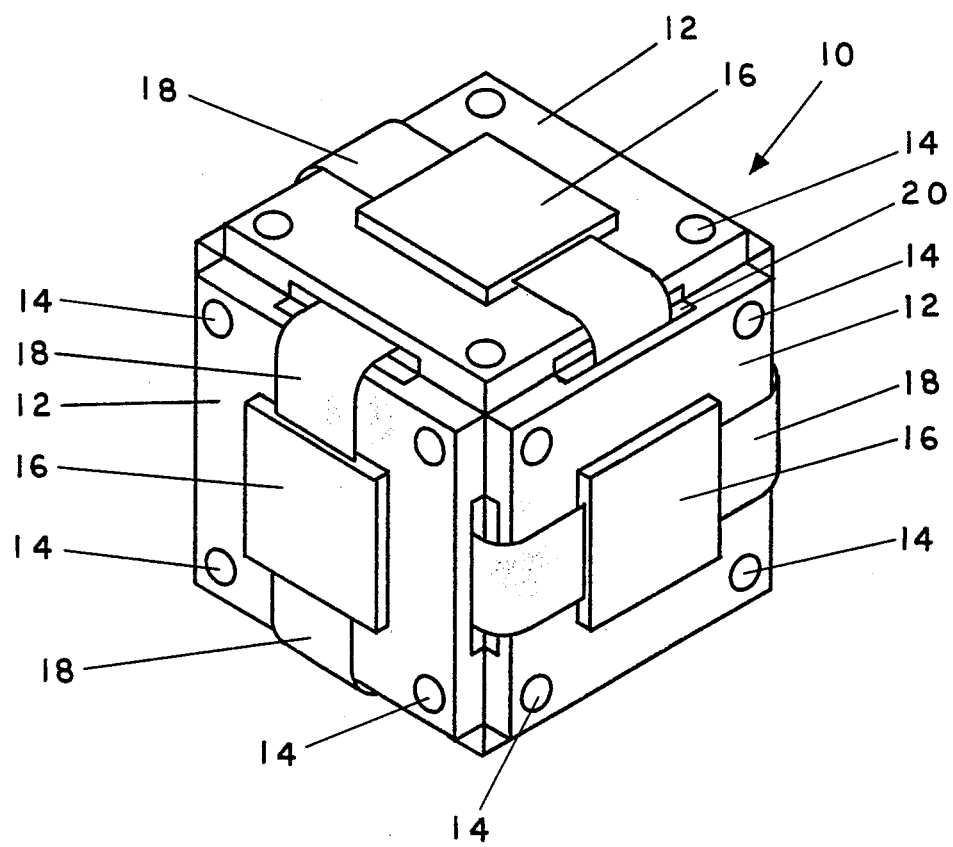

INERTIAL MEASUREMENT UNIT

BACKGROUND OF THE INVENTION

1. Field of the Invention

This invention relates generally to inertial measurement units. More specifically, this invention relates to accelerometers and gyroscopes.

While the present invention is described herein with reference to a particular embodiment for particular applications, it is to be understood that the invention is not limited thereto. Those having ordinary skill in the art and access to the teachings of the present invention, will recognize additional embodiments and applications within the scope thereof.

2. Description of the Related Art

Inertial navigation has long been recognized as an advantageous method of navigation inasmuch as no external reference is required. Navigation is accomplished by sensing the motion of the vehicle and calculating the change of position after initial alignment. This requires accurate instrumentation for detecting rotational motion (angular turning rates) and linear or translational motion relative to a stabilized frame of reference. Gyroscopes (gyros) are typically used to detect angular turning rates. The gyro is typically implemented in a servo-loop to stabilize a frame of reference on which accelerometers may be mounted to measure linear motion. The stabilized frame of reference may be a platform on or within a vehicle or the vehicle itself.

In its simplest form, a gyro may be brought of as a rapidly spinning rotor or flywheel supported on a mount which allows freedom of tilt of the spin axis relative to the base. The rapid spinning of the flywheel gives the spin axis of the gyro a stubborn resistance to angular deflections. The gyro thus tends to preserve its original orientation which with proper alignment is also the desired vehicle or platform frame of reference.

A single degree of freedom gyro is one having a spin axis that is allowed to move in one direction and restrained in the others. A two axis gyro is one having an axis of rotation capable of deflection in either of two planes or axes. Similarly, a three axis gyro is one having an axis of rotation capable of deflection in either of three axes. Such gyros are therefore said to have two and three degrees freedom resectively and are known as free gyros.

Since three axes of stabilization are required to stabilize a frame of reference, either three single axis gyros, two two axis gyros or one three axis gyros is required. The use of three single axis gyros was initially prefered to multiple axis gyros until techniques were developed to model and eliminate cross-coupling between axes in multiple axis gyros. U.S. Pat. No. 3,823,990 issued to P.. J. Gilinson Jr. on July 16, 1974 discloses a three axis gyro (see FIG. 13). Gilinson typifies conventional gyros in that it operates on the principle of a spinning flywheel. In some applications such as space however, the weight associated with the gyro flywheel is particularly undesireable. Thus there is a need to reduce the weight and cost associated with conventional gysoscopes.

As mentioned above, the accelerometer is the second typically essential component of conventional inertial measurement units. An accelerometer is a device that measures the acceleration of the vehicle in one direction relative to the stabilized frame or reference. Conventional mechanical accelerometers include a spring or hinge adapted for deflection in response to acceleration. A mechanical, optical, inductive or capacitive pickoff is used to detect motion of the hinge. To meet manufacturing tolerances, the hinge or spring is biased. Such factors as vibration, shock, temperature variations, and time dependent stress relief shift the bias and introduce errors in the output calculation. Conventional mechanical accelerometers require frequent calibration and alignment relative to the gyros. In addition, these accelerometers are difficult to manufacture as the spring or hinge must typically be machined, ground, or polished to exact specifications. The difficulty in doing so, lowers the yield and raises the cost of producing such instruments.

A further disadvantage of conventional mechanical accelerometers results from the need to physically mount the accelerometer on the frame of reference, typically either a stabilized platform or the vehicle itself. To protect the instrument from vibration, rubber isolators are typically used. Over time, the isolators often lose resiliency and settle in a manner that causes misalignment of the accelerometer. This provides an additional source of error.

The degree of damping also imposes a limitation on gain. A high gain system requires a tight servo. That is, since a high gain system is quick to respond to vibration, inadequate damping may lead to a degradation in performance and/or undesired oscillation. Thus, it would be desireable to provide a system with high damping thereby permitting high servo gain with the associated improvement in system performance.

Conventional mechanical accelerometers are also subject to resonance from the spring constant associated with the accelerometer or the restraint. Resonance is undesirable as an additional source of output error.

It is desireable therefore to provide a single, suspended, integrated, accurate, inexpensive, lightweight instrument capable of providing a three axis angular turning rate detector (or reference frame stabilizer) and a self-damping nonmechanical three axis accelerometer with no mechanical supports or restraints.

SUMMARY OF THE INVENTION

The present invention substantially overcomes many of the problems associated with prior art inertial measurement units by providing a single, integrated, lightweight combination three axis angular turning rate detector and three axis accelerometer with a mechanically independent fully suspended sensor mass.

The invention consists of an outer assembly having parallel arrays of suspension elements and sensing elements on each interior surface and a sensor mass suspended within the outer assembly and having arrays of suspension and sensing elements in face-to-face relation with the corresponding elements of the outer assembly.

In the illustrative embodiment, the suspension elements are magnetic and the sensing elements are capacitive. When the system is energized, the sensor mass is suspended within the outer assembly for mechanically independent relative motion in any direction. In the preferred embodiment, the sensing elements are cross-coupled to minimize cross axis sensitivity.

The invention operates in a system including conventional servo-loops or control systems which stabilize the sensor within the outer assembly.

BRIEF DESCRIPTION OF THE DRAWINGS

FIG. 1 is a perspective view of an illustrative embodiment of the present invention.

DESCRIPTION OF THE INVENTION

Figure 2:
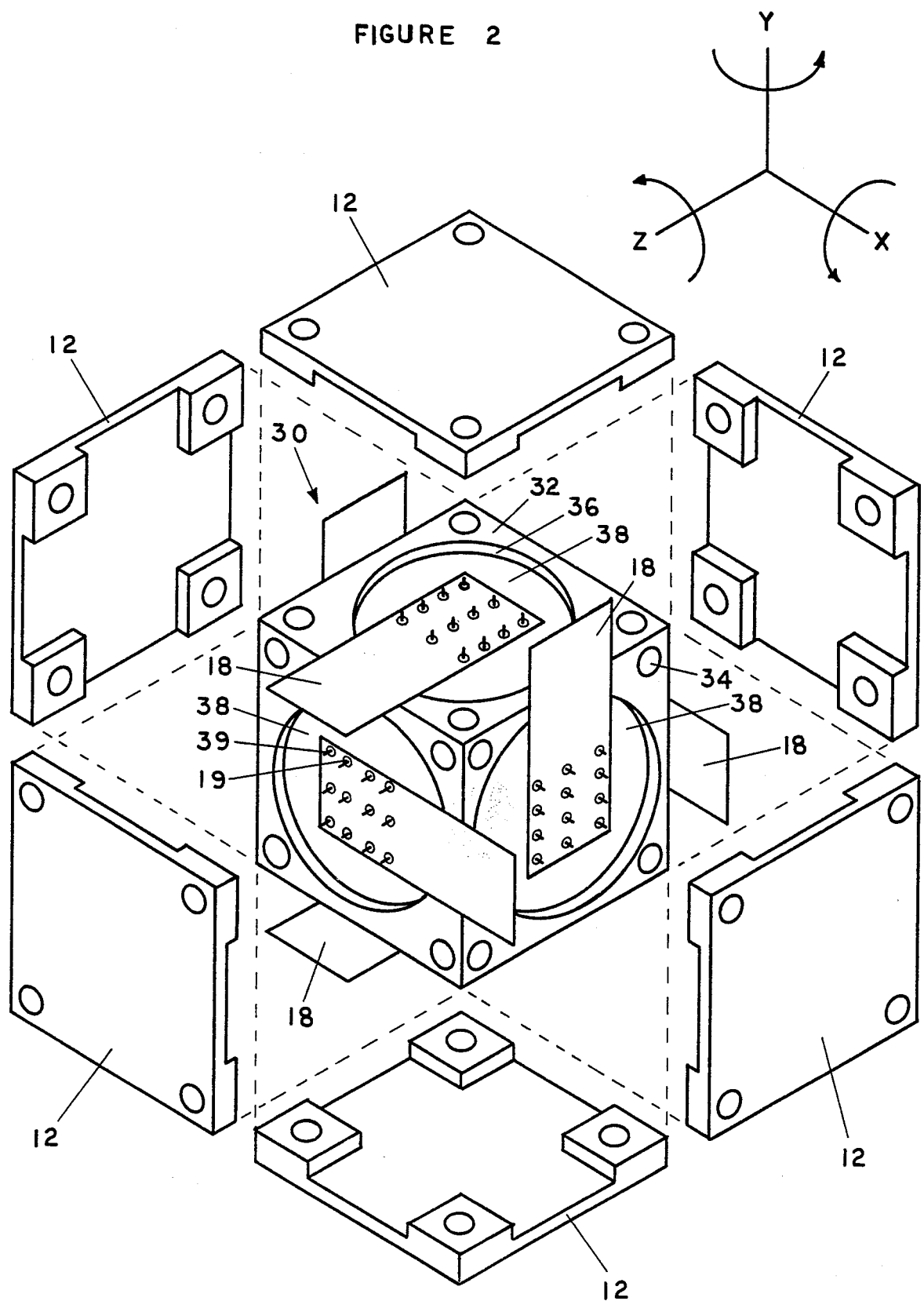
FIG. 2 is a partially exploded perspective view of the preferred embodiment of the present invention.

The preferred embodiment of the present invention provides a magnetically suspended combination three axis accelerometer and three axis angular turning rate detector. The advantageous features of the present invention are made possible by the use of a sensor mass and suspension assembly of unique and novel design. An illustrative embodiment of the invention is shown fully shielded in FIG. 1. The invention 10 ("Morrison's Cube" hereinafter the "Cube") is shown with cover plates 12 which serve as electromagnetic shields. As discussed more fully below, the Cube consists of an outer assembly 30 and an inner assembly (sensor mass) 50. The cover plates 12 are made of metal or other suitable material. The plates are secured to the Cube by screws or rivets 14. Electronic circuitry (hybrids) is housed in packages 16 which are mounted on cover plates 12. Electrical signals are brought out of the Cube by ribbon connectors or flex tapes 18 to the packages 16 through openings 20.

Removal of the packages 16 and disassembly of the cover plates shows in FIG. 2 the outer assembly 30 of the Cube with ribbon connectors or flex tapes 18 in place. The outer assembly 30 consists of an outer cube 32 of ceramic, metal or other suitably rigid lightweight material. The outer cube 32 is hollow and has a plurality of holes 34 by which the cover plates 12 are secured to the Cube. Through bores 36 outer plate assemblies 38 are secured to the outer cube 32. Six outer plate assemblies are provided, one on each side of the cube 32.

As discussed more fully below, a plurality of pins 39 extend from the rear of the outer plate assemblies 38. The pins 39 engage the flex tapes 18 at terminals 19. As shown more clearly in FIG. 3, the pins 39 are attached to contacts 40 and coils 42. The pins 39a, 39b and 39c are connected to pins 40a, 40b, and 40c and so on respectively. Note that two pins g and h or i and j etc. are required for each coil 42gh, 42ij, etc.. Each of the six sides of the Cube has an outer plate assembly 38 with a set of pins 39. Each side of the Cube is numbered 1-6 so that electrical signals coming from a particular pin of a particular plate are associated with a particular movement as discussed more fully below. Thus signals on pin 'a' of a plate 38 on side '2' would be labeled as 39a2, signals on pin 'e' of the same plate would be 39e2, the same pin on a plate 38 on side 3 would be 39e3, a coil on the same plate would be addressed as 39gh3 etc.. For the purpose of illustration, this addressing system is adopted for the present invention although other suitable schemes will be readily recognized by those skilled in the art.

Figure 4:
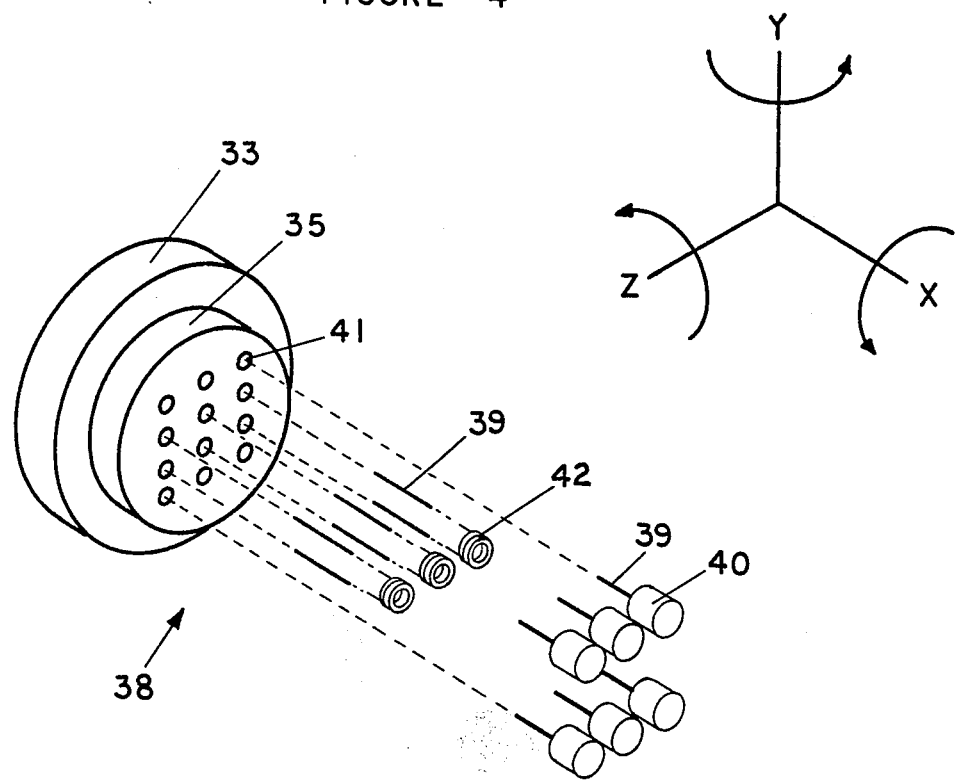
FIG. 4 is an exploded perspective view of the disassembled outer plate assembly.

The outer plates 38 are identical. An illustrative configuration of the plate 38 is shown in disassembled relation in FIG. 4. The plate 38 has a major periphery 33 and a minor periphery 35. The plate 38 is constructed of ceramic or other suitable material. The plates 38 are bonded to the outer cube 32 to provide a hermetic seal. Each plate 38 has a plurality of openings 41 through which the pins 39 extend. The pins 39 are part of the metal contacts 40 and similar pins 39 are connected to the coils 42. The number of turns of the coil is a design variable to be determined by analysis to meet design specifications in a conventional manner.

Figure 3:
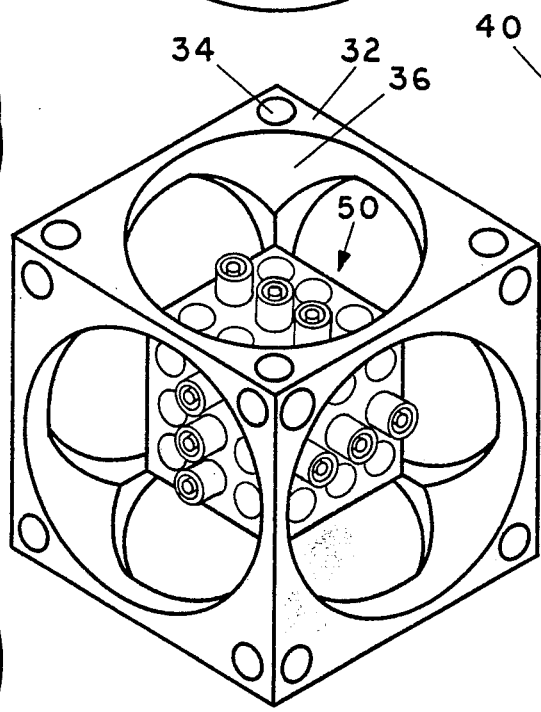
FIG. 3 is a further exploded perspective view of the preferred embodiment of the present invention.

As shown in FIG. 3, the outer assembly provides three sets of suspension elements and three sets of sensing elements. Each set is formed by the coils 42 and contacts 40 on two plates 38 on opposing sides which are mounted in face-to-face relation on the outer cube 32. Thus, the plates on sides 1 and 3 form a first set, plates on sides 2 and 4 form a second set and sides 5 and 6 form a third set. On each plate are three coils 42 arranged in a line to form a linear array of suspension elements. The linear array of suspension elements or coils 42 on each plate are aligned with the other plate in the set, and perpendicular to the linear arrays of suspension elements of the other sets. Stated alternatively, each set of suspension elements is disposed in a plane perpendicular to the planes in which the remaining sets are disposed and perpendicular to the corresponding axis of rotation and axis of translation.

Figure 5:
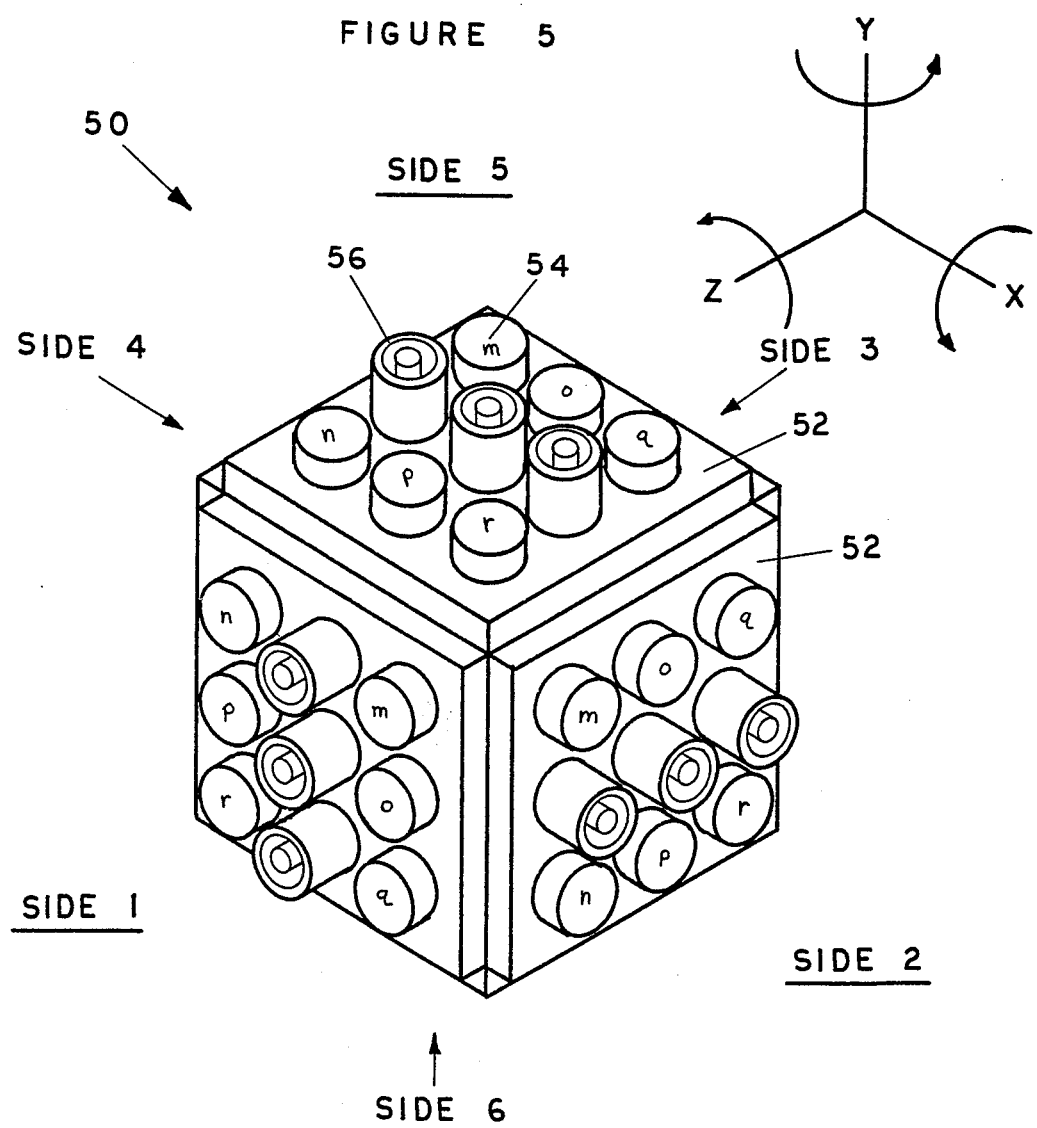
FIG. 5 is a perspective view of the sensor mass of the present invention.
Figure 6:
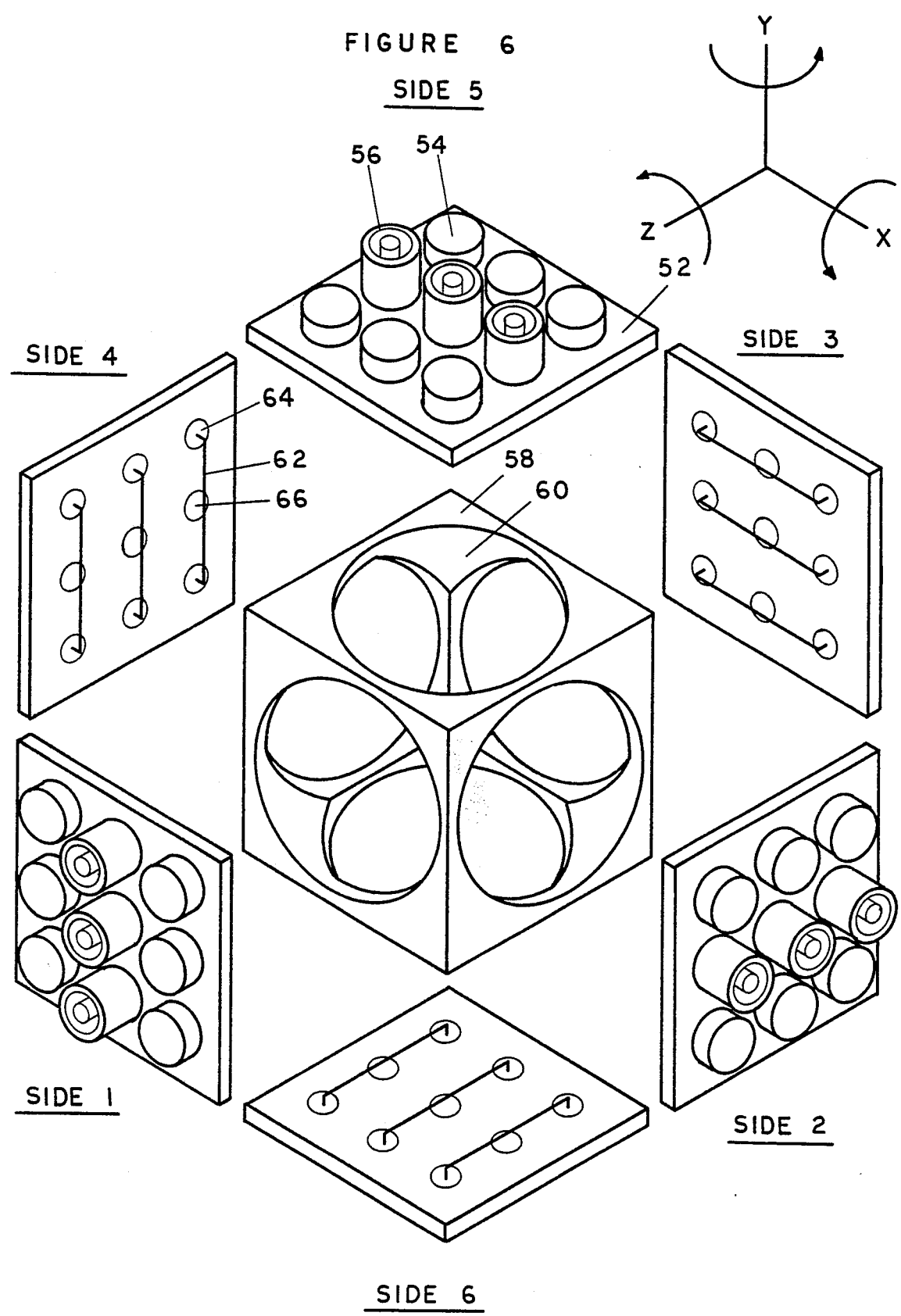
FIG. 6 is an exploded perspective view of the disassembled sensor mass of the present invention.

Each outer plate 38 includes two mutually parallel linear arrays of contacts 40 which serve as sensing elements. As shown in FIG. 3, the linear arrays of contacts 40 are mounted on each side of the linear arrays of coils 42. The pairs of linear arrays of contacts 40 are aligned with the pair of linear arrays of contacts 40 on the opposing plate with which it forms a set. Stated alternatively, each set of sensing elements is disposed in a plane perpendicular to the planes in which the remaining sets are disposed and perpendicular to the corresponding axis of rotation and axis of translation. Similarly, the sensor mass 50 is shown in FIGS. 5 and 6 as having three sets of suspension elements and three sets of sensing elements. Each set is formed by the magnetic assemblies 56 and contacts 54 on two opposing plates 52 disposed in back-to-back relation on the inner cube 58. Thus the plates on sides 1 and 3 form a first set, plates on sides 2 and 4 form a second set and plates on sides 5 and 6 form a third set. Each plate in each set includes a set of suspension elements or magnetic assemblies 56 arranged in a linear array. The linear array of suspension elements on each plate are aligned with the corresponding array of suspension elements on the other plate in the set and perpendicular to the arrays of the other sets. Stated alternatively, each set of suspension elements is disposed in a plane perpendicular to the planes in which the remaining sets are disposed and perpendicular to the corresponding axis of rotation and axis of translation.

Each plate in each set also includes a linear array of contacts 54 which serve as sensing elements. The contacts 54 on each plate are arranged in mutually parallel linear arrays. As shown in FIG. 6, the linear arrays of contacts 54 are disposed on either side of the linear array of magnetic assemblies 56. The linear arrays of contacts 56 are aligned with the corresponding arrays on the opposing plate in each set. Stated alternatively, each set of sensing elements is disposed in a plane perpendicular to the planes in which the remaining sets are disposed and perpendicular to the corresponding axis of rotation and axis of translation.

Thus the outer assembly 30 and the sensor mass 50 together form a three axis suspension and sensing arrangement by which the sensor mass 50 is suspended within the outer assembly 30 for independent movement in any direction with no mechanical connection thereto.

Figure 7:
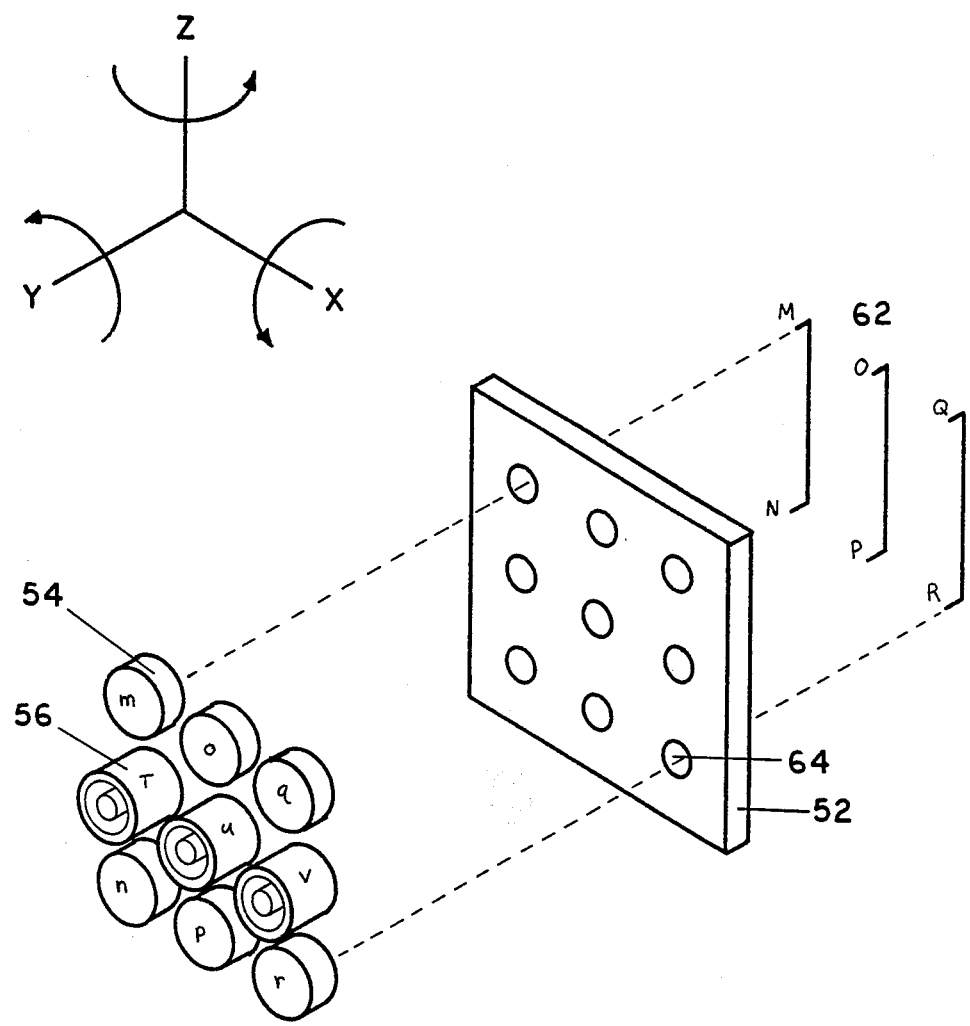
FIG. 7 is an exploded view of the inner plate assembly of the present invention.
Figure 8:
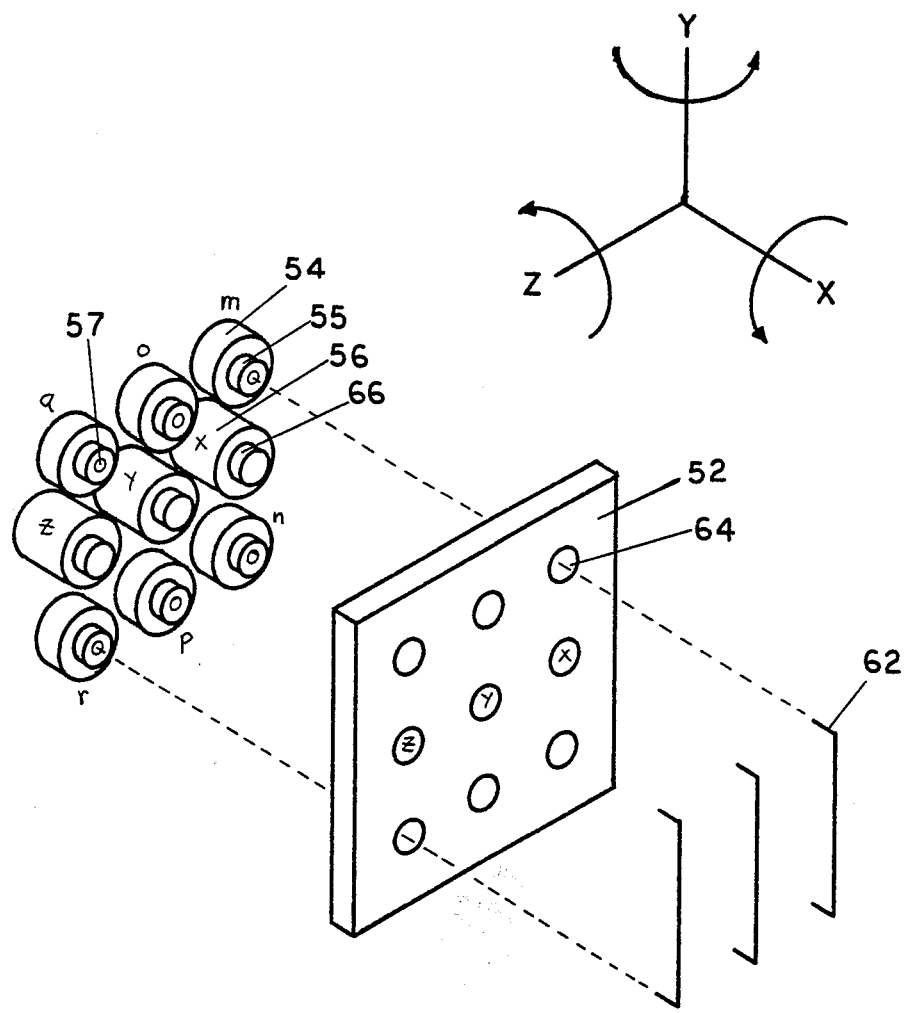
FIG. 8 is a rear exploded view of the inner plate assembly of the present invention.

Returning briefly to FIG. 3, the sensor mass 50 is shown within the outer cube 32. The sensor mass 50 is isolated in the assembled perpective view of FIG. 5. It is shown in greater detail in the exploded view of FIG. 6 where the sensor mass assembly 50 is seen to include a structural inner cube 58 of ceramic, metal or other suitably lightweight material. The inner cube 58 has a plurality of bores 60 to reduce weight. An inner plate assembly is affixed to each face of the outer cube 58. The plate 52 is made of ceramic or other suitable material. As shown in FIG. 7, the plate 52 is generally square with a matrix of openings 64 therethrough. Contacts 54 are secured to the plate 52 at the openings 64 with contacts labeled m and n joined by the mn jumper 62. Similarly, the pins labeled o and p are joined by the op jumper 62 and so on. FIG. 8 shows a rear view of the contacts 54 as having an annular section 55 designed to slide into the opening 64 for case of assembly. The annular section 55 has a small opening 57 to receive the end of the corresponding jumper 62. As shown in FIG. 7 three magnetic assemblies 56 $t$, $u$ and $v$ are attached to the plate 52 at the middle row of openings 64. Each magnetic assembly includes a peg 66 to facilitate engagement with the opening 64 of the plate 52.

Figure 9:
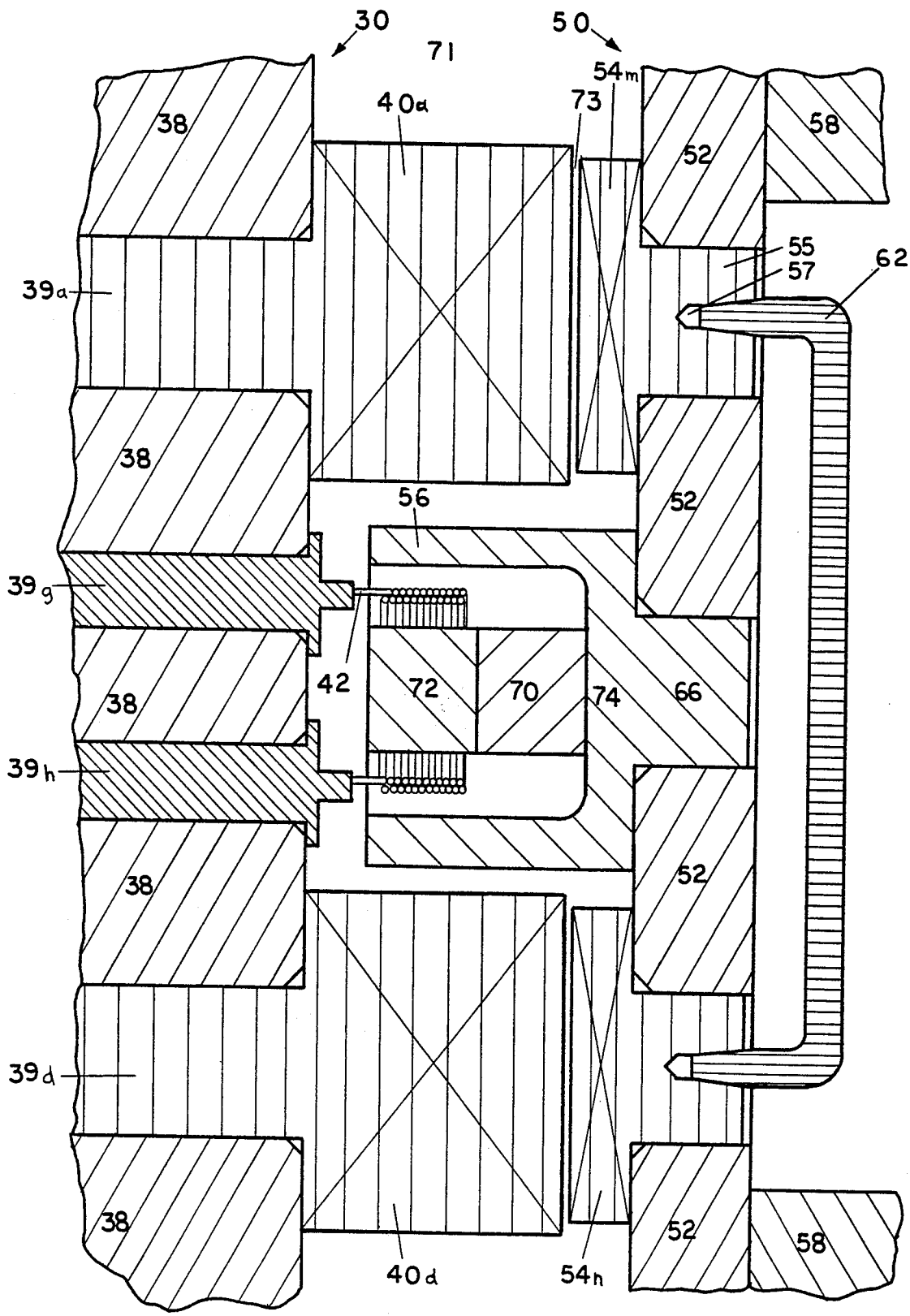
FIG. 9 is a cross-sectional view of the inner plate assembly and outer plate assembly in close physical relation.

One side of the sensor mass 50 and the corresponding side of the outer assembly 30 are shown in operational engagement in the sectional view of FIG. 9. The outer capacitive contact 40a is shown in close physical relation to the inner capacitive contact 54m. The outer contact 40a has a larger surface area than that of the inner contact 54m to account for manufacturing tolerance and to minimize erroneous intepretation of transverse translation motion as longitudinal translation. This helps to eliminate the cross-axis sensitivity that might exist if the contacts were the same size. Thus, if the outer assembly 38 were to move in a north/south direction for example, the entire face of the contact 54m would continue to see the face of contact 40, no area would be lost. This helps to avoid ambiguity inasmuch as the servos might otherwise detect the loss of surface contact as rotational motion or motion in another direction.

It would be apparent to those skilled in the art that the contacts 40a and 54m provide a capacitive pickoff 73 as shown in FIG. 9. The changes in the spacing of the contacts 40a and 54m are detected by the servos 90 and 100. Capacitive pickoffs and servos are known in the art (See *Measurement Systems Application and Design* by Ernest O. Doebelin, McGraw Hill Publishing Co., revised edition 1975, pp 250-257).

There is no physical contact between the outer assembly 30 and the inner assembly 50. In the preferred embodiment, the volumetric gap 71 between the outer assembly 30 and the inner assembly 50 is filled with oil or other suitable suspension fluid which floats the inner assembly 50 within the outer assembly 30. The fluid provides high damping thus allowing a high servo gain to minimize cross-axis sensitivities and rectifications in shock and vibration environments. It is conceivable to use a gas as the damping medium. The contacts 40 and 54 are bonded or cemented to the surfaces 38 and 52 respectively.

The pin 39a is seen in FIG. 9 as extending through the plate 38 into engagement with the outer contact 40a. The inner contact 54m is connected with contact 54n through jumper 62. Similarly, contact 54n is capacitively coupled with contact 40d which is in turn connected to external electronics via pin 39d. Contacts 40 and 54 thus provided sensing elements.

The magnetic assembly 56 is shown in FIG. 9 below the contact 40a. The magnetic assembly 56 includes a permanent magnet 70, a pole cap 72, a return path 74 and peg 66. The magnet 70 and pole cap 72 are adapted to slide into the center of the coil 42. The coil 42 is energized by current on pins 39g and 39h. The flux generated by the energized coil 42 repels or attracts the permanent magnet assembly 56 depending on the direction of the current. Thus the generated flux tends to maintain the assembly 56 at a desired distance. The current levels within the coils 42 are directly related to the acceleration of the inertial measurement unit 10. The coils 42 are thus selectively energized to suspend the sensor mass 50 relative to the outer assembly 30.

Figure 10:
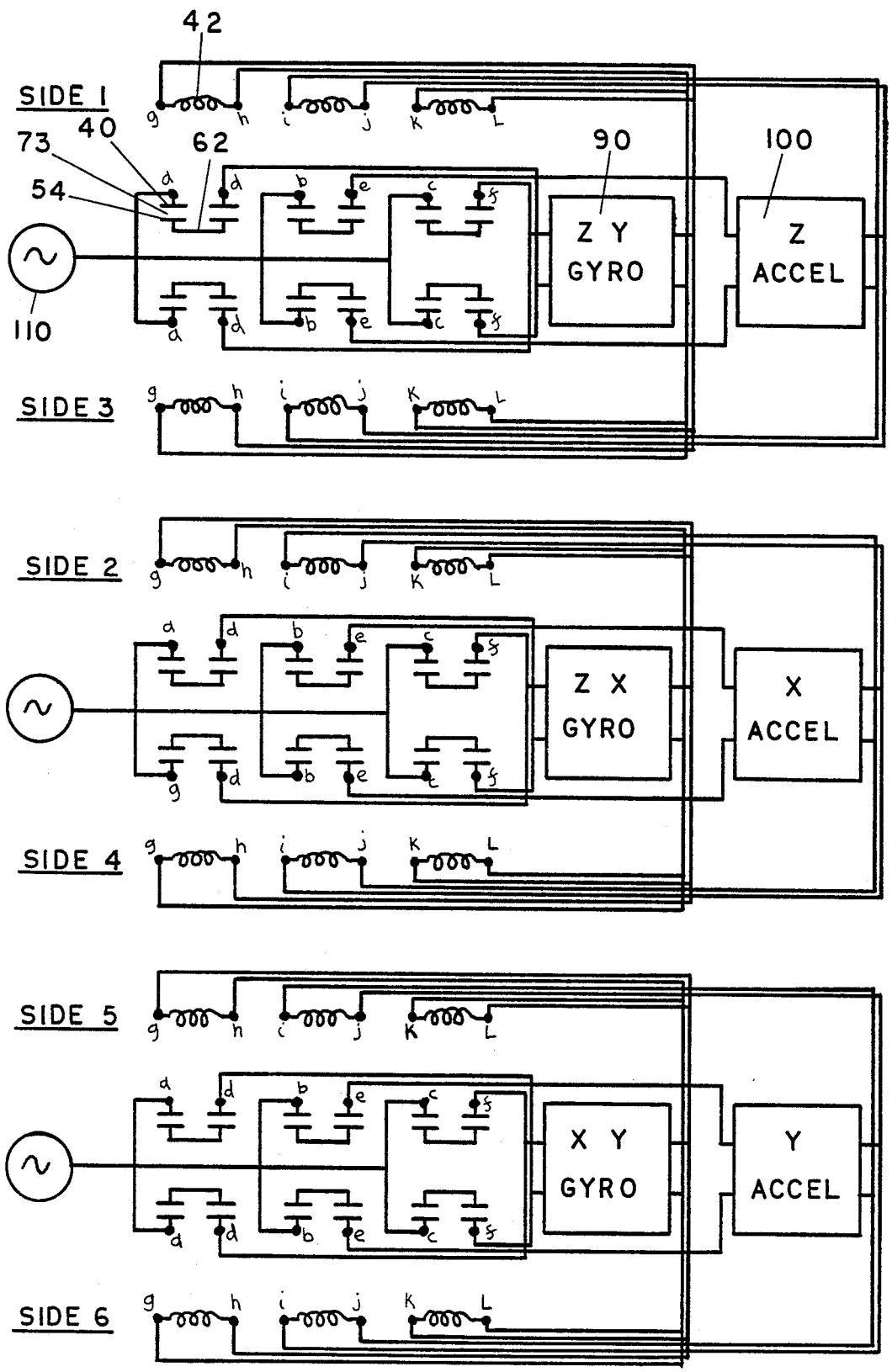
FIG. 10 is an electrical schematic diagram of the present invention.

The combination three axis accelerometer and three axis angular turning rate detector of the present invention is shown schematically in FIG. 10. It includes a plurality of coils 42, capacitive pickoffs 73 and servo-control circuits 90 and 100. Note that one gyro servo 90 and one accelerometer 100 is provided for each axis. Thus a total of six servos are utilized in the invention. It is understood that the servos could be combined into a single system within the scope of the invention.

While sides 1 and 3 are described below, it is understood that the same applies to the other corresponding opposing sides 2 and 4 and 5 and 6. Thus, for side 1, the plate 38 has coils 42gh and 42kl electrically connected to the gyro-servo 90 as the coils gh and kl on each interior surface of the outer assembly 30 are used to maintain the angular attitude of the sensor mass 50. The coils 42ij on each side are connected to the accelerometer servo 100. Inputs to the servos 90 and 100 are received from the capacitive pickoffs 73 which have one side connected to a sinusoidal voltage source 110. Thus the d contact and the f contact on each plate 38 are connected to the gyro-servo 90 and the e contact is connected to the accelerometer-servo 100. In effect and for the advantages set forth below in the "Operation", the contacts and therefore the pickoffs are shown in FIG. 10 to be cross-coupled from one plate to another. One of ordinary skill in the art will recognize other electrical circuits which will accomplish the functions of extracting from the coils 42, and capacitive pickoffs 73, signals representative of the relative position of the outer assembly 30 and the sensor mass 50 and using those signals in a servo-loop to control the position of the sensor mass 50.

OPERATION

Accelerometer

Assuming for the purpose of explanation that the Cube is assembled and energized, the sensor mass 50 of FIG. 3 is electromagnetically suspended within the outer assembly 30. Using the x,y,z coordinate system provided, movement of the outer assembly 30 in the z direction causes side 3 of the sensor mass 50 to move closer to side 3 of the outer assembly 30. Simultaneously, side 1 of the sensor mass 50 moves away from side 1 of the outer assembly 30. The capacitive pickoffs 73 on side 3 experience an increase in capacitance resulting from a decrease in the distance between the contacts 40 on the outer plate 38 and 54 on the inner plate 52. This change in capacitance causes a corresponding change in the input impedance at the accelerometer. As discussed more fully below, the accelerometer servo 100 sees a net change in impedance at contacts 40b and e. The accelerometer servo 100 will see no change in the impedance at the gyro contacts 40a and d and 40 c and f on sides 1 and 3.

The accelerometer servo 100 will compare the impedance at pins 40b and 40e on side 3 to that at pins 40b and 40e on side 1. If any difference is detected between these impedance the servo 100 will cause current flow through coils 42 at pins 42i and 42j of side 1 and side 3. The field generated by current flow through the center coil 42 on side 3 will push the sensor mass 50 while the field generated by current flow through the center coil 42 on side 1 will pull the sensor mass 50. The amount of current flow is directly proportional to the amount of acceleration. Thus the sensor mass 50 will remain centered between the plates 38 of sides 1 and 3. Similarly, motion in the x and y directions yields a similar reaction in the corresponding components of sides 2 and 4 and 5 and 6 respectively thus providing a three axis accelerometer.

The zy gyro servo 90 is sensitive to movement in the zy plane and sees no voltage difference at the cross-coupled contacts 40d of side 1 and 40f of side 3 compared to that at contacts 40d of side 3 and 40f of side 1 in response to z axis movement. In short, no difference is noted in response to the z axis movement because the contacts are cross coupled. The zy gyro 90 sees the same voltage change on its side 1 input and its side 3 input. Thus the movement is not interpreted as rotation. Finally, the contacts on sides 2, 4, 5 and 6 do not move closer together or farther apart with z axis translation, the corresponding gyro and accelerometer servos 90 and 100 do not see any net change or imbalance in input voltages.

One or ordinary skill in the art will see that the same analysis applies to translations in the x and y axes and therefore that a three-axis accelerometer is provided with minimal cross-axis sensitivity.

Angular Turning Rate Detector

Assuming once again that the Cube is assembled and energized such that the sensor mass 50 of FIG. 3 is suspended within the outer assembly 30. Assume further that the outer assembly 30 experiences a counter-clockwise rotation or angular turn about the x axis. Contacts 40a and d of side 3 and contacts 40c and f of side 1 of the outer plate 38 move closer to the corresponding contacts on the inner plate 52 of the sensor mass 50. Simultaneously, contacts 40c and f of side 3 move toward the sensor mass 50 and 40 a and d of side 1 move away from the sensor mass 50. The zy gyro servo 90 will compare the resulting impedance changes and rotate the sensor mass 50 in a counter-clockwise direction, by energizing the four outside coils 42gh and kl on sides 1 and 3. That is, the zy gyro servo 90 will cause current to flow such that the coils 42gh of side 1 and 42kl of side 3 will generate a force of attraction toward the corresponding permanent magnets 70 of the sensor mass 50. Likewise, the gyro servo 90 will generate a pushing force with coils 42kl of side 1 and 42gh of side 3.

The z axis accelerometer servo 100 will not detect any translational motion as a result of the rotational motion because (1) there will be little if any change in the proximity of the contacts on either side, thus little change in impedance and (2) any such change in the impedance associated with the accelerometer pickoffs of side 1 via contacts 40b and e will be matched by corresponding changes in that of the accelerometer pickoffs of side 3 and vice versa. Thus the z axis accelerometer servo 100 of FIG. 10 sees a balanced voltage on both sides of the sensor mass 50.

Similarly, the gyro and accelerometer servos 90 and 100 servicing sides 2 and 4 will not detect any motion in response to the rotation about the x axis because the contacts of the pickoffs associated with sides 2 and 4 do not undergo any relative movement in response to rotation about the x axis. That is the contacts do not move any closer together or farther apart in response to such rotation.

Servos of sides 5 and 6 do not react but for a different reason. When the outer assembly rotates around the x axis counter-clockwise the sensor mass initially experiences relative clockwise rotation. Contacts 40a,b and c on sides 5 and 6 move farther away from the corresponding contacts on the sensor mass 50 while contacts 40d,e and f move closer to the corresponding contacts on the sensor mass. For example, refering now to FIG. 10, contact 40d on one side is cross-coupled to contact 40f on the other and vice versa. The gyro servo 90 will see the same voltage on each side and detect no change in angular position. The same is true for the corresponding accelerometer servos 100.

One of ordinary skill in the art will see that a corresponding angular turn about the other axes causes a corresponding set of reactions such that the Cube provides a three axis angular rate detector or gyroscope with minimal cross-axis sensitivity.

Thus the present invention has been described with reference to a particular embodiment in connection with particular applications. Those having ordinary skill in the art and access to the teachings of the present invention will recognize additional modifications and applications within the scope thereof. For example, electrostatic suspension may be used in place of electromagnetic suspension. Other well known techniques may be used to provide the sensing function such as magnetic or optical pickoffs. The number of suspension and sensing elements used on each side may be changed. The inner and outer cubes 58 and 32 may be eliminated if another technique for holding the plates in position is employed. The materials used in the Cube may be changed to fit a particular application and it is understood that the size of the Cube may be such as is necessary for the intended environment. As a final example, the number of axes of detection may be as few as one or as many as n within the teachings of the invention. These examples are not exhaustive but merely intended to provide some insight into the possibilities provided by the present invention to one of ordinary skill in the art.

Such modifications and applications are contemplated by the appended claims in which what is claimed is:

1. An apparatus for use in an inertial measurement unit for sensing motion in plural independent mutually orthogonal linear axes and plural independent mutually orthogonal angular axes of operation comprising:
   an outer assembly having a plurality of parallel opposing interior surfaces and a sensor mass disposed within said outer assembly, said outer assembly including:
      a first set of suspension elements for suspending said sensor mass along each axis of operation including two face-to-face suspension elements disposed on opposing interior surfaces of said outer assembly and
      a first set of sensing elements for sensing motion of said outer assembly relative to said sensor mass along each axis of operation including two face-to-face pairs of sensing elements, each pair of elements being disposed on opposing interior surfaces of said outer assembly, with the corresponding suspension elements disposed between each pair of sensing elements and
   said sensor mass including:
      a second set of suspension elements cooperative with said first set of suspension elements to suspend said sensor mass relative to said outer assembly along each axis of operation including two back-to-back suspension elements on opposing exterior surfaces of said sensor mass and
      a second set of sensing elements cooperative with said first set of sensing elements to sense motion of said sensor mass relative to said outer assembly along each axis of operation including two back-to-back pairs of sensing elements each pair of sensing elements being disposed on opposing exterior surfaces of said sensor mass with the corresponding suspension element disposed between each pair of sensing elements
   whereby each suspension element and each sensing element on the sensor mass faces a corresponding suspension or sensing element respectively of said outer assembly such that the sensor mass is suspended within the outer assembly for movement in said axes of operation mechanically independent thereof.

2. The apparatus of claim 1 wherein said suspension elements are magnetic.

3. The apparatus of claim 2 wherein the suspension elements on said outer assembly are coils and the suspension elements on said sensor mass are magnets.

4. The apparatus of claim 3 including a servo-control system for selectively supplying power to the coils on the outer assembly to maintain the sensor mass in a pre-determined position relative to said outer assembly.

5. The apparatus of claim 1 wherein said sensing elements are capacitive contacts.

6. The apparatus of claim 5 including circuit means electrically connected to said capacitive contacts to provide a signal representative of the motion the sensor mass relative to said outer assembly.

7. The apparatus of claim 6 wherein said circuit means further includes a signal generator for providing an input signal which is modulated by capacitive pick-offs formed by said capacitive contacts in response to motion of said sensor mass assembly relative to said outer assembly.

8. The apparatus of claim 1 wherein the sensor means is suspended relative to said outer assembly to provide a gap therebetween and said gap is filled with fluid.

9. The invention of claim 1 wherein said sensing elements are cross-coupled.

10. A combination accelerometer and angular turning rate detector for sensing motion in plural independent mutually orthogonal linear axes and plural independent mutually orthogonal angular axes of operation comprising:
   an outer assembly having a plurality of parallel opposing interior surfaces and a sensor mass disposed within said outer assembly, said outer assembly including:
      a first set of suspension elements for suspending said sensor mass along each axis of operation including two face-to-face suspension elements disposed on opposing interior surfaces of said outer assembly and
      a first set of sensing elements for sensing motion of said outer assembly relative to said sensor mass along each axis of operation including two face-to-face pairs of sensing elements, each pair of elements being disposed on opposing interior surfaces of said outer assembly, with the corresponding suspension elements disposed between each pair of sensing elements and
   said sensor mass including:
      a second set of suspension elements cooperative with said first set of suspension elements to suspend said sensor mass relative to said outer assembly along each axis of operation including two back-to-back suspension elements on opposing exterior surfaces of said sensor mass and
      a second set of sensing elements cooperative with said first set of sensing elements to sense motion of said sensor mass relative to said outer assembly along each axis of operation including two back-to-back pairs of sensing elements each pair of sensing elements being disposed on opposing exterior surfaces of said sensor mass with the corresponding suspension element disposed between each pair of sensing elements
   whereby each suspension element and each sensing element on the sensor mass faces a corresponding suspension or sensing element respectively of said outer assembly such that the sensor mass is suspended within the outer assembly for movement in said axes of operation mechanically independent thereof.

11. The invention of claim 10 wherein said sensing elements are cross-coupled.

12. An accelerometer for sensing motion in plural independent mutually orthogonal linear axes of operation comprising:
   an outer assembly having a plurality of parallel opposing interior surfaces and a sensor mass disposed within said outer assembly, said outer assembly including:
      a first set of suspension elements for suspending said sensor mass along each axis of operation including two face-to-face suspension elements disposed on opposing interior surfaces of said outer assembly and
      a first set of sensing elements for sensing motion of said outer assembly relative to said sensor mass along each axis of operation including two face-to-face pairs of sensing elements, each pair of elements being disposed on opposing interior surfaces of said outer assembly, with the corresponding suspension elements disposed between each pair of sensing elements and said sensor mass including:
- a second set of suspension elements cooperative with said first set of suspension elements to suspend said sensor mass relative to said outer asembly along each axis of operation including two back-to-back suspension elements on opposing exterior surfaces of said sensor mass and
- a second set of sensing elements cooperative with said first set of sensing elements to sense motion of said sensor mass relative to said outer assembly along each axis of operation including two back-to-back pairs of sensing elements each pair of sensing elements being disposed on opposing exterior surfaces of said sensor mass with the corresponding suspension element disposed between each pair of sensing elements whereby each suspension element and each sensing element on the sensor mass faces a corresponding suspension or sensing element respectively of said outer assembly such that the sensor mass is suspended within the outer assembly for movement in said axes of operation mechanically independent thereof.

13. The invention of claim 12 wherein said sensing elements are cross-coupled.

14. An angular turning rate detector for sensing motion in plural independent mutually orthogonal linear axes and plural independent mutually orthogonal angular axes of operation comprising:

an outer assembly having a plurality of parallel opposing interior surfaces and a sensor mass disposed within said outer assembly, said outer assembly including:
- a first set of suspension elements for suspending said sensor mass along each axis of operation including two face-to-face suspension elements disposed on opposing interior surfaces of said outer assembly and
- a first set of sensing elements for sensing motion of said outer assembly relative to said sensor mass along each axis of operation including two face-to-face pairs of sensing elements, each pair of elements being disposed on opposing interior surfaces of said outer assembly, with the corresponding suspension elements disposed between each pair of sensing elements and said sensor mass including:
- a second set of suspension elements cooperative with said first set of suspension elements to suspend said sensor mass relative to said outer assembly along each axis of operation including two back-to-back suspension elements on opposing exterior surfaces of said sensor mass and
- a second set of sensing elements cooperative with said first set of sensing elements to sense motion of said sensor mass relative to said outer assembly along each axis of operation including two back-to-back pairs of sensing elements each pair of sensing elements being disposed on opposing exterior surfaces of said sensor mass with the corresponding suspension element disposed between each pair of sensing elements whereby each suspension element and each sensing element on the sensor mass faces a corresponding suspension or sensing element respectively of said outer assembly such that the sensor mass is suspended within the outer assembly for movement in said axes of operation mechanically independent thereof.

15. The invention of claim 14 wherein said sensing elements are cross-coupled.

16. A combination three axis angular turning rate detector and three axis accelerometer for sensing motion in plural independent mutually orthogonal linear axes and plural independent mutually orthogonal angular axes of operation comprising:

an outer assembly and a sensor mass disposed within said outer assembly, said outer assembly having a plurality of opposing parallel interior surfaces including:
- three first sets of suspension elements one for suspending said sensor mass along each axis each set including two parallel face-to-face linear arrays of suspension elements, each array being disposed on opposing interior surfaces of said outer assembly in a line perpendicular to the lines in which the arrays of suspension elements of the other first sets are disposed, and each first set of suspension elements being disposed in planes perpendicular to the planes in which the remaining first sets are disposed, each of said planes being perpendicular to first, second and third mutually orthogonal axes and
- three first sets of sensing elements one for sensing motion of said outer assembly relative to said sensor mass along each axis each set including two parallel face-to-face pairs of mutually parallel linear arrays of sensing elements, each pair of arrays being disposed on opposing interior surfaces of said outer assembly in lines perpendicular to the lines in which the pair of arrays of sensing elements of the other first sets of sensing elements are disposed, with a corresponding linear array of suspension elements disposed between and parallel to each pair of linear arrays of sensing elements, and each first set of sensing elements being disposed in planes perpendicular to the planes in which the remaining first sets are disposed, each of said planes being perpendicular to said first, second, and third mutually orthogonal axes and said sensor mass including:
- three second sets of suspension elements one cooperative with said first set of suspension elements to suspend said sensor mass relative to said outer assembly along each axis each second set of suspension elements including two parallel back-to-back linear arrays of suspension elements, each array being disposed on opposing exterior surfaces of said sensor mass in a line perpendicular the lines in which the arrays of suspension elements of the other second sets are disposed, and each set of suspension elements being disposed in planes perpendicular to the planes in which the remaining second sets are disposed, each of said planes being perpendicular to first, second and third mutually orthogonal axes and
- three second sets of sensing elements one for cooperative with said first set of sensing elements to sense motion of said sensor mass relative to said outer assembly along each axis each second set of sensing elements including two parallel backto-back pairs of mutually parallel linear arrays of sensing elements, each pair of arrays being disposed on opposing exterior surfaces of said sensor mass in lines perpendicular to the lines in which the pair of arrays of sensing elements of the other second sets are disposed, with the corresponding linear array of suspension elements disposed between and parallel to each pair of linear arrays of sensing elements, and each second set of sensing elements being disposed in planes perpendicular to the planes in which the remaining second sets are disposed, each of said planes being perpendicular to said first, second, and third mutually orthogonal axes, whereby each array of suspension and sensing elements of the sensor mass faces a corresponding array of suspension and sensing elements on said outer assembly respectively such that the sensor mass is suspended within the outer assembly for movement mechanically independent thereof in any of said mutually orthogonal axes.

17. The invention of claim 16 wherein said sensing elements are cross-coupled.

18. In an inertial navigation system having a servo-control system for processing output from sensing elements of and regulating energy to suspension elements of an inertial measurement unit, an improved apparatus for use in an inertial measurement unit for sensing motion in plural independent mutually orthogonal linear axes and plural independent mutually orthogonal angular axes of operation comprising:

an outer assembly having a plurality of parallel opposing interior surfaces and a sensor mass disposed within said outer assembly, said outer assembly including:

a first set of suspension elements for suspending said sensor mass along each axis of operation including two face-to-face suspension elements disposed on opposing interior surfaces of said outer assembly and a first set of sensing elements for sensing motion of said outer assembly relative to said sensor mass along each axis of operation including two face-to-face pairs of sensing elements, each pair of elements being disposed on opposing interior surfaces of said outer assembly, with the corresponding suspension elements disposed between each pair of sensing elements and said sensor mass including:

a second set of suspension elements cooperative with said first set of suspension elements to suspend said sensor mass relative to said outer assembly along each axis of operation including two back-to-back suspension elements on opposing exterior surfaces of said sensor mass and a second set of sensing elements cooperative with said first set of sensing elements to sense motion of said sensor mass relative to said outer assembly along each axis of operation including two back-to-back pairs of sensing elements each pair of sensing elements being disposed on opposing exterior surfaces of said sensor mass with the corresponding suspension element disposed between each pair of sensing elements whereby each suspension element and each sensing element on the sensor mass faces a corresponding suspension or sensing element respectively of said outer assembly such that the sensor mass is suspended within the outer assembly for movement in said axes of operation mechanically independent thereof.

19. The invention of claim 18 wherein said sensing elements are cross-coupled.

* * * * *